(12) United States Patent
Schmidlin et al.

(10) Patent No.: US 10,268,212 B2
(45) Date of Patent: Apr. 23, 2019

(54) METHOD AND DEVICES FOR BALANCING A GROUP OF CONSUMERS IN A FLUID TRANSPORT SYSTEM

(71) Applicant: BELIMO HOLDING AG, Hinwil (CH)

(72) Inventors: Peter Schmidlin, Uster (CH); Reto Hobi, St. Gallenkappel (CH); Urs Keller, Hinwil (CH); Norbert Lederle, Laufenburg (DE); Marc Thuillard, Uetikon am See (CH)

(73) Assignee: BELIMO HOLDING AG, Hinwil (CH)

( * ) Notice: Subject to any disclaimer, the term of this patent is extended or adjusted under 35 U.S.C. 154(b) by 381 days.

(21) Appl. No.: 14/649,975

(22) PCT Filed: Dec. 6, 2013

(86) PCT No.: PCT/EP2013/003691
§ 371 (c)(1),
(2) Date: Jun. 5, 2015

(87) PCT Pub. No.: WO2014/094991
PCT Pub. Date: Jun. 26, 2014

(65) Prior Publication Data
US 2015/0316935 A1 Nov. 5, 2015

(30) Foreign Application Priority Data
Dec. 18, 2012 (CH) .................................. 2849/12

(51) Int. Cl.
*G05D 7/06* (2006.01)
*G05B 15/02* (2006.01)
*F24D 19/10* (2006.01)

(52) U.S. Cl.
CPC ........ *G05D 7/0623* (2013.01); *F24D 19/1015* (2013.01); *G05B 15/02* (2013.01); *F24D 2220/0264* (2013.01); *F24D 2220/044* (2013.01)

(58) Field of Classification Search
CPC ....... Y10T 137/8593; Y10T 137/85954; Y10T 137/87925; H04L 47/10; H04L 47/20;
(Continued)

(56) References Cited

U.S. PATENT DOCUMENTS 6,912,574 B2 * 6/2005 Scifres ................. H04L 47/10
370/230
7,113,990 B2 * 9/2006 Scifres ................. H04L 47/10
370/230
(Continued)

FOREIGN PATENT DOCUMENTS

DE 40 19 503 A1 1/1992
FR 2 949 146 A1 2/2011
(Continued)

OTHER PUBLICATIONS

International Search Report of PCT/EP2013/003691 dated Mar. 25, 2014 [PCT/ISA/210].
(Continued)

*Primary Examiner* — Darrin D Dunn
(74) *Attorney, Agent, or Firm* — Sughrue Mion PLLC (57) ABSTRACT

To balance (S3) a group of consumers in a fluid transport system in which each consumer is provided with a motorized control valve for regulating the flow through the consumer, characteristic data for the consumers is stored (S2) which determines a valve position of the relevant control valve for target flows through one of the consumers in each case. A current total flow through the group of consumers is determined by means of a common flow sensor
(Continued)

(S32) and a balance factor (S34) is defined on the basis of the current total flow and a sum of the desired target flows through the consumers. The consumers are dynamically balanced by setting (S31) the valve settings for the corresponding control valves on the basis of the characteristic data and the balance factor.

10 Claims, 4 Drawing Sheets

(58) Field of Classification Search
CPC ............ F24D 19/1015; F24D 19/1036; G01M 3/2807; G06Q 10/06; G06Q 50/06; A61M 5/16804; A61M 5/16831; A61M 5/16877; G06F 11/3006; E03B 7/02; E03B 7/071; E03B 7/075; E03B 1/04; E03B 7/003
See application file for complete search history.

(56) References Cited

U.S. PATENT DOCUMENTS

| | | | | |
|---|---|---|---|---|
| 7,920,983 | B1* | 4/2011 | Peleg | G01M 3/2807 137/1 |
| 8,109,289 | B2* | 2/2012 | Trnka | F24D 19/1015 137/487 |
| 9,493,931 | B2* | 11/2016 | Burrows | E03B 7/02 |
| 9,568,392 | B2* | 2/2017 | Peleg | G01M 3/2807 |
| 2003/0225905 | A1* | 12/2003 | Scifres | H04L 47/10 709/234 |
| 2004/0060602 | A1* | 4/2004 | Mullins | B01D 61/12 137/551 |
| 2005/0226153 | A1* | 10/2005 | Scifres | H04L 47/10 370/232 |
| 2009/0118871 | A1* | 5/2009 | Debourke | E03C 1/041 700/282 |
| 2010/0049480 | A1* | 2/2010 | Pekar | F24D 19/1015 703/2 |
| 2010/0147394 | A1* | 6/2010 | Trnka | F24D 19/1015 137/12 |
| 2011/0178644 | A1* | 7/2011 | Picton | E03B 7/071 700/282 |
| 2011/0215945 | A1* | 9/2011 | Peleg | G01M 3/2807 340/870.02 |
| 2012/0136490 | A1* | 5/2012 | Weatherbee | G01B 7/003 700/282 |
| 2012/0226259 | A1* | 9/2012 | Yodfat | A61M 5/14244 604/500 |
| 2014/0039849 | A1* | 2/2014 | Preis | E03B 7/02 703/1 |
| 2014/0130873 | A1* | 5/2014 | Brody | G01F 15/005 137/1 |
| 2014/0211624 | A1* | 7/2014 | Rajasekaran | H04L 47/30 370/235 |
| 2015/0350260 | A1* | 12/2015 | Tadepalli | H04L 65/403 709/203 |
| 2016/0025514 | A1* | 1/2016 | Pitchford | G08C 17/02 340/870.02 |
| 2016/0291608 | A1* | 10/2016 | Reider | G05B 15/02 |

FOREIGN PATENT DOCUMENTS

| | | |
|---|---|---|
| RU | 15 775 U1 | 11/2000 |
| RU | 104 289 U1 | 5/2011 |

OTHER PUBLICATIONS

Communication dated Oct. 27, 2017 from the Russian Patent and Trademark Office in counterpart application No. 2015129492/12(045543).

* cited by examiner

METHOD AND DEVICES FOR BALANCING A GROUP OF CONSUMERS IN A FLUID TRANSPORT SYSTEM

CROSS REFERENCE TO RELATED APPLICATION

This application is a National Stage of International Application No. PCT/EP2013/003691,filed Dec. 6, 2013, claiming priority based on Swiss Patent Application No. 02849/12, filed Dec. 18, 2012, the content of all of which are incorporated herein by reference in their entirety.

TECHNICAL FIELD

The present invention relates to a method and devices for balancing a group of consumers in a fluid transport system. The present invention relates in particular to a method and devices for balancing a group of consumers in a fluid transport system in which each consumer is provided with a motorized regulating valve for regulating the flow through the consumer.

PRIOR ART

Fluid transport systems typically comprise a plurality of consumers, i.e., parallel branches or lines through which a liquid or gaseous fluid is transported for thermal energy distribution, for example. The consumers usually have different designs, i.e., they have different diameters and/or lengths of the transport lines, e.g., pipelines and have different e.g., varying flow rates, i.e., volume flows. To achieve a balanced or balanced distribution of the fluid to the consumers in such fluid transport systems, the consumers are each configured with an equalizing or balancing element, for example, an adjustable control member, in particular a valve, which can adjust the flow through the respective consumer with different degrees of opening and/or valve position.

DE 69706458 describes a method for balancing a network for the distribution of an incompressible liquid, in which two pressure connections are provided for each branch on both sides of the balancing element, and another, i.e., a third, pressure connection is arranged at a distance therefrom. In all branches, flow measurements are performed by measuring the pressure difference on both sides of the respective balancing element, and the pressure difference is measured by means of the third pressure connection. On the basis of these measured values, the hydraulic resistance coefficients of all branches and sections are calculated for the main line. Finally, with knowledge of the desired flow in each branch and using the determined resistance coefficients, the setting positions of each balancing element are calculated and set. The balancing method requires a plurality of pressure connections for each balancing element and is not configured for a dynamic balancing of a fluid transport system.

DESCRIPTION OF THE INVENTION

One object of the present invention is to propose a device and a method for balancing a group of consumers in a fluid transport system without at least some of the disadvantages of the prior art. In particular, one object of the present invention is to propose a device and a method for balancing a group of consumers in a fluid transport system configured for dynamic balancing of the fluid transport system without requiring separate sensors for determining the flow at each consumer.

According to the present invention, these goals are achieved by the features of the independent claims. Additional advantageous embodiments are also derived from the dependent claims and the description.

The goals defined above are achieved by the present invention in particular in that for balancing a set of consumers, in a fluid transport system in which each consumer is configured with a motorized regulating valve for regulating the flow through the consumer is stored, characteristic data for the consumers, which determines a valve position of the corresponding regulating valve for target flows through one of the consumers at a constant pressure. By means of a common flow sensor, a current total flow through the group of consumers is ascertained. Based on the current total flow and a sum of the desired target flows through the consumers, a balancing factor is determined. A dynamic balancing of the consumers is performed by setting the valve position of the corresponding regulating valves based on the characteristic data and the target flows scaled using the balancing factor.

Accordingly, a device for balancing the group of consumers in the fluid transport system comprises a characteristic data module which is configured to store the characteristic data for the consumers, and a balancing module which is configured to determine the balancing factor based on the current total flow and the sum of the desired target flows through the consumers and to perform the dynamic balancing of the consumers by setting the valve position of the corresponding regulating valves based on the characteristic data and the target flows scaled with the balancing factor.

By balancing the consumers based on the actual total flow and the sum of the desired target flows, an automatic and dynamic balancing of the fluid transport system is made possible which manages by using a single common flow sensor for measuring the total flow through the group of consumers without having to use a plurality of separate flow sensors or pressure connections, respectively, in the regulating valves of the individual consumers.

The characteristic data for the consumers is preferably detected by means of the common flow sensor by measuring the flow through the consumers in various valve position of the regulating valves. The current pressure in the fluid transport system is calculated on the basis of these measurements, and the characteristic data for the consumers is normalized to the constant pressure in the fluid transport system based on the actual pressure in the fluid transport system.

Accordingly, the characteristic data module is configured to detect the characteristic data for the consumers by measuring the flow through the consumers in various valve position of the regulating valves by means of the common flow sensor, to calculate the actual pressure in the fluid transport system based on the measurements and to normalize the characteristic data to the constant pressure in the fluid transport system for the consumers based on the actual pressure in the fluid transport system.

By normalizing the characteristic data for the constant pressure in the fluid transport system, the characteristic data can be used even with pressure changes during the measurement and detection of the characteristic data without significant distortion for the balancing of the consumers during operation of the fluid transport system.

The normalization of the characteristic data for the consumers is preferably accomplished by scaling the measured flow through each one of the consumers based on the actual pressure in the fluid transport system. Accordingly, the characteristic data module is configured to normalize the characteristic data for the consumers by scaling the measured flow through each one of the consumers based on the actual pressure in the fluid transport system.

In one embodiment variant, the actual pressure in the fluid transport system is calculated based on a linear pump characteristic for at least one line segment having a plurality of consumers. Accordingly, the characteristic data module is configured to calculate the actual pressure in the fluid transport system based on a linear pump characteristic for at least one line segment having a plurality of consumers.

In one embodiment variant, the characteristic data for the consumers of the set is detected by the fact that the regulating valves for a first part of the consumers are set in a blocked setting, and the flow through a second part of the consumers is measured by means of the joint flow sensor in various valve position. For example, the characteristic data for a consumer of the set is detected by the fact that the regulating valves for the other consumers in the group are set in a locked position and the flow through the one of the consumers is measured in various valve position by means of the common flow sensor.

Accordingly, the characteristic data module is configured to detect the characteristic data by the fact that it sets the regulating valves for the first part of the consumers in the locked position and measures the flow through the second part of the consumers in different valve position by means of the joint flow sensor. For example, the characteristic data module is configured to detect the characteristic data for the one consumer of the group by the fact that it sets the regulating valves for the other consumers of the set in a locked position and measures the flow through the one of the consumers in various valve position by means of the common flow sensor.

Determining the characteristic data of the consumers or the regulating valves, respectively, by sequential flow measurement of a single consumer, i.e., a regulating valve of the group in the case of closed regulating valves of the other consumers of the group, permits a particularly simple and efficient determination. Simultaneous measurement of a plurality of consumers, i.e., regulating valves of the group with closed valves for the other consumers of the group, for example, a paired measurement, permits a more accurate determination if the flow is more favorably located in the working range of the flow sensor that is used due to the simultaneous opening of a plurality of regulating valves.

In one embodiment variant, the balancing factor is determined periodically and the dynamic balancing of the consumers is performed periodically. Accordingly, the balancing module is configured to periodically determine the balancing factor and to periodically perform the dynamic comparison of consumers.

The periodic determination of the balancing factor and periodic execution of the dynamic balancing make it possible to balance the fluid transport system, i.e., the consumers, automatically, dynamically and continuously and to adapt them to altered system conditions, i.e., consumer demands.

In addition to a method and a device for balancing a group of consumers in a fluid transport system, the present invention also relates to a computer program product having computer program code for controlling one or more processors of a device such that the device executes the method for balancing the group of consumers in the fluid transport system, in particular a computer program product having an accessible, computer-readable non-volatile storage medium, in which the computer program code is stored.

BRIEF DESCRIPTION OF THE DRAWINGS

One embodiment of the present invention is described below on the basis of an example. The example of the execution is illustrated by the following accompanying figures.

MEANS OF IMPLEMENTING THE INVENTION

Figure 1:
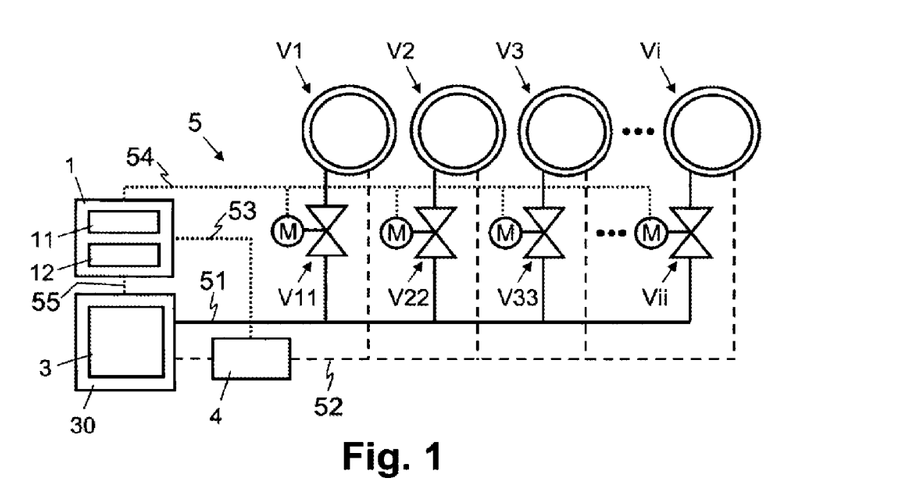
FIG. 1: shows a block diagram illustrating schematically a fluid transport system with a group of consumers and a device for dynamic balancing of the consumers.
Figure 2:
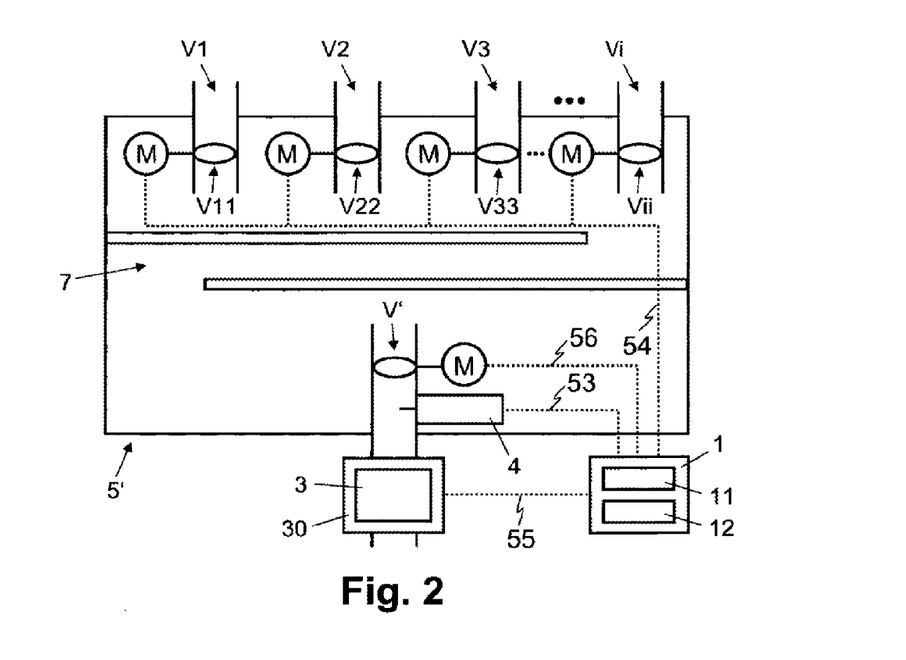
FIG. 2: shows a block diagram illustrating schematically a fluid transport system for gaseous fluids with a group of consumers and a device for dynamic balancing of the consumers.

In FIGS. 1 and 2, the reference numerals 5 and 5' each relate to fluid transport systems having a group of several consumers V1, V2, V3, Vi, for example, heating, ventilation and cooling, i.e., HVAC (heating, ventilating and air conditioning) fluid transport systems 5, 5'. As diagrammed schematically in FIGS. 1 and 2, the fluid transport systems 5, 5' each comprise a working machine 3 for conveying the fluid in the fluid transport system 5, 5', in particular one or several pumps for conveying fluids, e.g., water or one or several fans for conveying gaseous fluids, e.g., air.

In FIG. 1, the closed circulation of the fluid transport system 5 is shown with a supply line 51 (forward flow) and a return line 52, e.g., pipelines. The consumers V1, V2, V3, Vi comprise, for example, one or several devices for exchanging thermal energy, in particular heat exchangers for heating or cooling heating elements, underflow heating systems or refrigeration units or so-called chillers, for example.

As shown in FIGS. 1 and 2, the consumers V1, V2, V3, Vi each have a respective regulating valve V11, V22, V33, Vii for regulating the flow to, i.e., through the consumers V1, V2, V3, Vi. The regulating valves V11, V22, V33, Vii are each arranged in the forward flow (supply line 51) or in the return flow (return line 52) of the consumers V1, V2, V3, Vi. The regulating valves V11, V22, V33, Vii each comprise a controllable electric motor M which drives the respective regulating valve V11, V22, V33, Vii and regulates the opening and thus the flow through, i.e., volume flow through the regulating valve V11, V22, V33, Vii through corresponding adjustment of a throttle body, e.g., a valve flap.

Reference numeral 30 relates to a higher-level control system which generates, for example, individual target values for the flows $Ft_i$ ("target flow") through the regulating valves V11, V22, V33, Vii.

As shown in FIGS. 1 and 2, the fluid transport system 5, 5' has a flow sensor 4 for measuring the total flow, i.e., total volume flow $Fc_{total}$("current total flow") through the set of consumers V1, V2, V3, Vi. The flow sensor 4 is preferably arranged in the return flow but may also be arranged in the forward flow.

The fluid transport system 5' shown in FIG. 2 is configured to for transport of gaseous fluids, wherein the consumers V1, V2, V3, Vi are residential rooms, for example, in which the regulating valves V11, V22, V33, Vii supply incoming air and/or from which the regulating valves V11, V22, V33, Vii remove exhaust air. A common motorized throttle valve V' and a sound damping 7 are connected upstream from the fluid passages and/or air passages that are regulated by the regulating valves V11, V22, V33, Vii.

In FIGS. 1 and 2 the reference numeral 1 relates to a balancing device for balancing the group of consumers V1, V2, V3, Vi, i.e., the fluid transport systems 5, 5'. As depicted schematically in FIGS. 1 and 2, the balancing device 1 comprises a plurality of functional modules, in particular a characteristic data module 11 and a balancing module 12. The functional modules are preferably programmed software modules for controlling one or more processors of the balancing device 1. The functional modules are stored in a computer-readable medium, which is permanently or removably connected to the balancing device 1. However, the skilled person will understand that, in alternative embodiment variants, the functional modules may be designed partially or completely with hardware components.

To control the regulating valves V11, V22, V33, Vii and/or their motors M, the balancing device 1 is connected to them by control lines or a control bus 54. For detecting the current total flow, i.e., the total volume flow $Fc_{total}$, through the group of consumers V1, V2, V3, Vi, the balancing device 1 is connected to the flow sensor 4 by a measurement line or a databus 53. To receive control signals and/or control parameters, in particular target values for the individual flows Ft, through the regulating valves V11, V22, V33, Vii, the balancing device 1 is connected to the control system 30 by a data line or a databus 55. Finally, the balancing device 1 is also connected to the throttle valve V' by a control line or a control bus 56.

Figure 3:
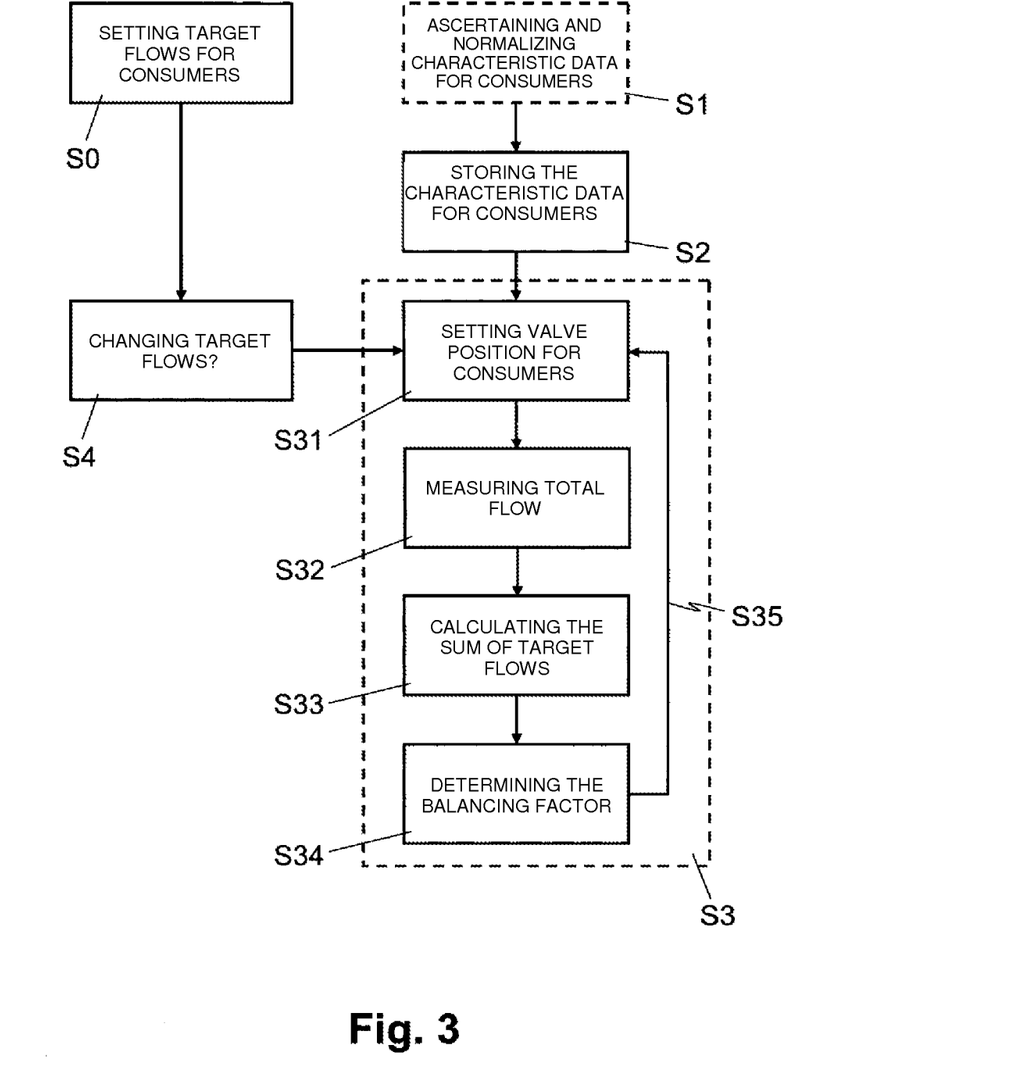
FIG. 3: shows a flowchart illustrating a sequence of steps for dynamic balancing of a fluid transport system with a group of consumers.

The functions of the characteristic data module 11 and the balancing module 12 as well as possible step sequences for the dynamic balancing of the fluid transport system 5, 5' are described in the following sections with reference to FIG. 3.

Figure 4:
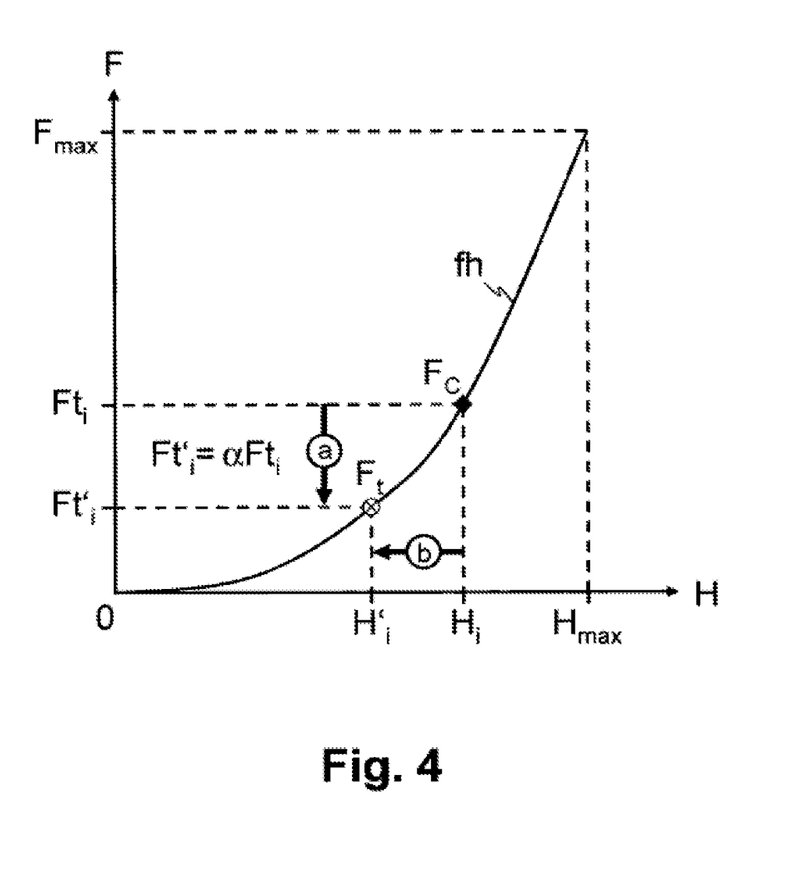
FIG. 4: shows a curve illustrating the adaptation of a valve position in pressure changes in the fluid transport system based on characteristic data of the valve and a balancing factor.

In the preparatory and optional step S1, the characteristic data module 11 detects characteristic data for the consumers V1, V2, V3, Vi and/or for the respective regulating valves V11, V22, V33, Vii, this data determining the valve position of the respective regulating valve V11, V22, V33, Vii at a constant pressure in the fluid transport system 5, 5' for target flows through the respective consumer V1, V2, V3, Vi and/or through the respective regulating valve V11, V22, V33, Vii. The curve fh in FIG. 4 illustrates the valve position H, which is to be set to achieve a desired target flow and/or volume flow F within the range F=0 at a closed position and $F=F_{max}$, at the maximally open position $H_{max}$ for a certain regulating valve V11, V22, V33, Vii and/or the corresponding consumer V1, V2, V3, Vi. Conversely, based on the curve fh, the flow and/or volume flow F through the respective consumer V1, V2, V3, Vi and/or through the respective regulating valve V11, V22, V33, Vii that can be achieved at a certain valve position H of the regulating valve V11, V22, V33, Vii (nominal flow at the respective valve position) can also be determined.

The characteristic data module 11 detects the characteristic data by the fact that it measures individually the regulating valves V11, V22, V33, Vii of one after the other individually starting from a blocked position in which the entire group of regulating valves V11, V22, V33, Vii is blocked. The measurements are performed at a constant but unknown initial pressure $\Delta P_0$ in the fluid transport system 5, 5'. In measurement of a regulating valve V11, V22, V33, Vii, the flow F achieved by the regulating valve V11, V22, V33, Vii at a constant initial pressure $\Delta P_0$ in various valves settings H is measured and saved in correspondence to the respective valve position H (nominal flow per valve position). For example, for the regulating valve i, on which the measurement is to be performed, the valve position H is opened incrementally, starting from the closed blocked position $H_0$, i.e., a higher-level valve position H is set, and for each valve position $H_i$ of the regulating valve i, the current flow and/or volume flow $F_i$ measured by the flow sensor 4 is detected such that this flow or volume flow corresponds to the flow and/or volume flow $F_i$ of the regulating valve i to be measured on the basis of the closed valve position of the other regulating valves.

In one embodiment variant, for example, when the flow is not in the optimum working range of the flow sensor 4 due to just one of the regulating valves V11, V22, V33, Vii, the characteristic data is determined by performing measurements on more than one of the regulating valves V11, V22, V33, Vii at the same time, for example, by simultaneous paired measurements on two of the regulating valves V11, V22, V33, Vii. In doing so, the regulating valves V11, V22, V33, Vii on which the measurements are to be performed are preferably measured in the same valve position, i.e., at the same percentage opening. Based on the characteristic data detected simultaneously for a plurality of regulating valves V11, V22, V33, Vii, the individual characteristic data (nominal flow per valve position) is calculated for the individual regulating valves V11, V22, V33, Vii by arithmetic operations.

To compensate for a change in the pressure in the fluid transport system 5, 5' during the measurement, the characteristic data is normalized for the constant initial pressure $\Delta P_0$. The flow $F_i$ in a consumer Vi is proportional to the square root of the pressure $\Delta P$ in the consumer Vi and/or in the respective group (line segment) of the consumers V1, V2, V3, Vi and/or the respective regulating valves V11, V22, V33, Vii:

$$F_i \sim \sqrt{\Delta P}.$$

The characteristic data is normalized by a calculation of the nominal flow $Fn_i$ per valve position Hi by the scaling $$Fn_i \approx \frac{Fn'_i}{\sqrt{\Delta P}}$$

of the non-normalized nominal flow $Fn'_i$ based on the actual pressure $\Delta P$ during the measurement. The actual pressure $\Delta P$ during the measurement is calculated on the basis of a plurality of measurements (by means of the flow sensor 4) of the flow through one or more of the regulating valves V11, V22, V33, Vii at various valve position.

For example, the following equation holds for a linear pump characteristic c in the fluid transport system 5, 5' or in the line segment or the group of consumers V1, V2, V3, Vi on which the measurements are to be performed and/or the respective regulating valves V11, V22, V33, Vii:

$$\Delta P = \Delta P_0 + c \cdot F \quad (1)$$

due to the dependence $$\Delta = \frac{F_j^2}{k_j^2}$$

of the pressure $\Delta P$ and the flow $F_j$ at a setting j of the consumers V, V2, V3, Vi characterized by the parameter value and/or the respective regulating valves V11, V22, V33, Vii it thus follows that:

$$\frac{F_j^2}{k_j^2} = \Delta P_0 + c \cdot F_j \quad (2)$$

Based on a plurality of measurements of the flow $F_j$ through one or more regulating valves V11, V22, V33, Vii at various valve position j which are explained below as an example with reference to FIGS. 5 and 6, the values for $\Delta P_0$, c, $k_j$ and finally $\Delta P$ are calculated for the normalization of the detected characteristic data. The prevailing pressure $\Delta P$ can thus be ascertained without using a pressure sensor.

Figure 5:
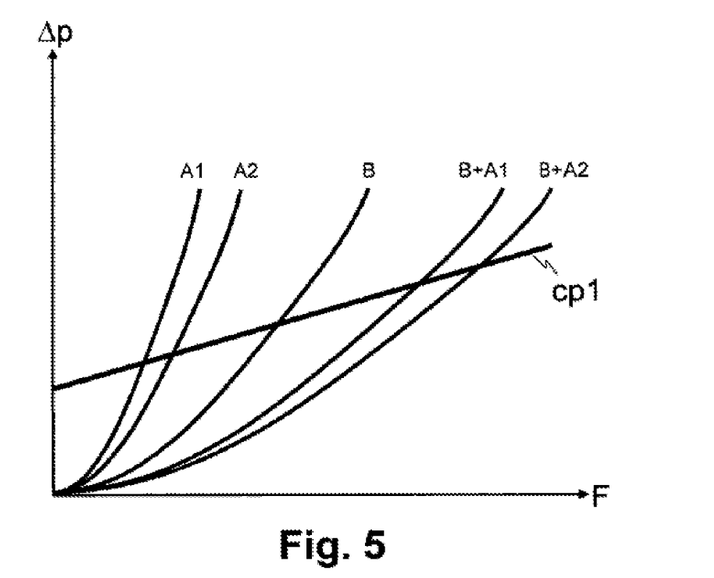
FIG. 5: shows an example of a scenario having two regulating valves and the flow through the regulating valves as a function of the pressure in the fluid transport system in various valve position.

FIG. 5 illustrates an example of a scenario with two regulating valves in which the pressure value $\Delta P$ is shown as a function of the flow F at various valve position j, wherein A1, A2 denote different valve position of the first regulating valve with the second regulating valve closed, B denotes an open valve position of the second regulating valve with the first valve closed and B+A1 and B+A2 respectively denote the valve position A1, A2 of the first valve with valve position B of the second regulating valve at the same time. The reference numeral cp1 denotes the linear pump characteristic $\Delta P = \Delta P_0 + c \cdot F$ of the pump (and/or working machine 3) of the fluid transport system 5, 5' for all valve position A1, A2, B, A1+B, A2+B, in which the measurements can enter into the calculation of the pressure value $\Delta P$ by means of equation (2).

Figure 6:
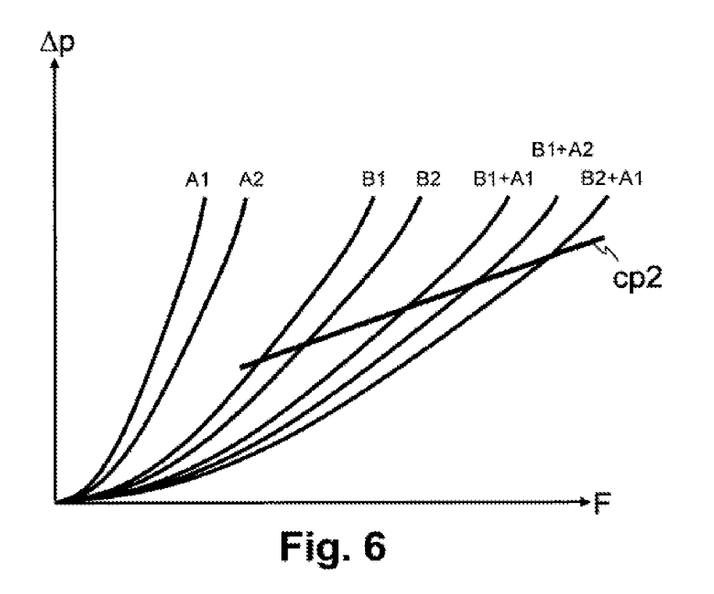
FIG. 6: shows another example of a scenario having two regulating valves and the flow through the regulating valves as a function of the pressure in the fluid transport system in various valve position.

FIG. 6 illustrates another example with two regulating valves in which the pressure value $\Delta P$ is shown at various valve position j as a function of the flow F, wherein A1, A2 denote different valve position of the first regulating valve with the second regulating valve closed, B1 and B2 denote an open valve position of the second regulating valve with the first valve closed and B1+A1, B1+A2 and B2+A1, respectively, denote the valve position A1, A2 of the first valve, with the valve position B1 at the same time and/or B2 of the second regulating valve, respectively. The reference numeral cp2 denotes the linear pump characteristic $\Delta P = \Delta P_0 + c \cdot F$ of the pump (and/or working machine 3) of the fluid transport system 5, 5' for the valve position B1, B2, B1+A1, B1+A2 and B2+A1, in which the measurements can enter into the calculation of the pressure value $\Delta P$ by means of the equation (2).

In preparatory step S2, the normalized characteristic data for the regulating valves V11, V22, V33, Vii is stored. Instead of the dynamic determination of the characteristic data in the optional step S1, in an alternative embodiment variant, known characteristic data of the regulating valves V11, V22, V33, Vii is detected and stored as data sheets, for example. A nominal flow, an identification and/or a type designation of the respective consumer V1, V2, V3, Vi and/or regulating valve V11, V22, V33, Vii is/are stored with the characteristic data.

In step S0, the individual target flows $Ft_i$ for the regulating valves V11, V22, V33, Vii are determined in the control system 30, for example, on the basis of current sensor values and/or user demands.

In startup (in starting operation) of the fluid transport system 5, 5' or when a change in the target flows $Ft_i$ is detected, the step S3 for the dynamic balancing of the fluid transport system 5, 5' and/or the consumers is triggered and activated in step S4.

In step S31, the balancing module 12 sets the valve position of the consumers V1, V2, V3, Vi and/or regulating valves V11, V22, V33, Vii based on the target flows Ft, for the individual consumers V1, V2, V3, Vi and/or regulating valves V11, V22, V33, Vii. For the target flows $Ft_i$, the valve position of the consumers V1, V2, V3, Vi and/or regulating valves V11, V22, V33, Vii are set for the constant but unknown initial pressure $\Delta P_0$ in the fluid transport system 5, 5'. To do so, the balancing module 12 uses the individual characteristic data of the consumers V1, V2, V3, Vi and/or regulating valves V11, V22, V33, Vii and ascertains, on the basis of this characteristic data for the regulating valves V11, V22, V33, Vii, the valve position $H_i$, which corresponds to the target flow $Ft_i$ and with which the respective current individual flow $F_i$ is to be achieved in the respective regulating valves V11, V22, V33, Vii. This current individual flow corresponds to the desired target flow $F_i = Ft_i$ at the constant but unknown initial pressure $\Delta P_0$. As will be described later, the current individual flows $F_i$ are each corrected with a balancing factor $F'_i = \alpha \cdot F_i$, which is initially set at $\alpha = 1$, for the calculations of the valve position $H_i$, in the assumption that the current pressure $\Delta Pc$ in the fluid transport system 5, 5' corresponds to the constant initial pressure $\Delta P_0$, $\Delta Pc = \Delta P_0$ (i.e., $$\alpha = \sqrt{\frac{\Delta P_0}{\Delta Pc}} = 1,$$

as will be explained later in conjunction with step S34).

In one embodiment variant, the balancing module 12 sets the valve position of the consumers V1, V2, V3, Vi and/or regulating valves V11, V22, V33, Vii, additionally taking into account an optimized use of the working machine 3 for the conveyance of fluids. The balancing module 12 operates as a pump optimizer, for example, to optimize the pump performance. To do so, the valve position of the consumers V1, V2, V3, Vi and/or regulating valves V11, V22, V33, Vii are opened increasingly up to a defined maximum limit value, for example, 70% or 80% of the maximum opening, while the pump performance is reduced accordingly, so that the total flow-through to be achieved remains the same. Thus, on the whole, the same flow and/or volume flow is/are achieved at a reduced pump power setting in the individual consumers V1, V2, V3, Vi and in the fluid transport system 5, 5'.

In one variant, the balancing module 12 sets the valve position of the consumers V1, V2, V3, Vi and/or regulating valves V11, V22, V33, Vii, additionally taking into account an optimized operation of the heat generator and/or refrigerator, so that the forward flow temperature can be maximized or minimized, wherein at least one valve reaches a stop setting.

In one embodiment variant, the balancing module 12 also investigates whether the valve position of at least one of the consumers V1, V2, V3, Vi and/or one of the regulating valves V11, V22, V33, Vii has reached a stop setting with maximum opening or a defined minimum setting. Valve position are given as numerical values, for example, which indicate a degree of opening, for example, in angle degrees or in fractions, e.g., percentages or a corresponding control value. The stop setting and/or the defined minimum setting of a consumer V1, V2, V3, Vi and/or regulating valve V11, V22, V33, Vii is/are stored as part of the respective characteristic data, for example. When a stop setting or a defined minimum setting has been reached, the balancing module 12 performs a corresponding defined exceptional regulation of the consumers V1, V2, V3, Vi and/or regulating valves V11, V22, V33, Vii.

In one variant, the exceptional regulation for a fixed stop setting provides that the flow is throttled in favor of the consumer V1, V2, V3, Vi and/or regulating valve V11, V22, V33, Vii at the stop with the other regulating valves V11, V22, V33, Vii of the group. To do so, the respective priority data for the consumers V1, V2, V3, Vi and/or the regulating valves V11, V22, V33, Vii is stored, for example, as part of the respective characteristic data. The priority data includes, for example, classification values or numerical values, which indicate a high or low importance or a certain step in a multi-valued scale. On ascertaining a stop setting, the balancing module 12 thus reduces the opening and therefore the flow through less important consumers V1, V2, V3, Vi and/or regulating valves V11, V22, V33, Vii, which have a priority value with a lower value than the consumer V1, V2, V3, Vi and/or the regulating valve V11, V22, V33, Vii in the stop position.

In one variant, the exceptional regulation provides that, for a fixed defined minimum setting, the fan power and/or pump power in the working machine 3 is reduced for conveying gaseous fluids in the fluid transport system 5, 5', i.e., in the fan, to prevent flow noise.

In step S32, the balancing module 12 ascertains the current total flow and/or total volume flow $Fc_{total}$ in the fluid transport system 5, 5' via the flow sensor 4, i.e., through the entire group of consumers V1, V2, V3, Vi and/or regulating valves V11, V22, V33, Vii.

In step S33, the balancing module 12 calculates the sum of the target flows $$Ft_{total} = \sum_i Ft_i$$

("total target flow") for the entire group of consumers V1, V2, V3, Vi and/or regulating valves V11, V22, V33, Vii.

In step S34, the balancing module 12 determines a balancing factor a on the basis of the current measured total flow $Fc_{total}$ actually achieved and the desired total target flow $$Ft_{total} = \sum_i Ft_i.$$

The balancing factor a is determined by pressure changes in the fluid transport system 5, 5' (current pressure $\Delta Pc$ with respect to a constant initial pressure $\Delta P_0$) and is calculated from the ratio:

$$\beta = \frac{\Delta P_0}{\Delta Pc}$$

of the constant but unknown initial pressure $\Delta P_0$ at the current but also unknown pressure $\Delta Pc$.

The ratio:

$$\beta = \frac{\Delta P_0}{\Delta Pc} = \left(\frac{\sum_i Ft_i}{Fc_{total}}\right)^2$$

here corresponds to the square of the ratio of the desired total target flow $$Ft_{total} = \sum_i Ft_i$$

(at a constant but unknown initial pressure $\Delta P_0$) to the current total flow $Fc_{total}$ actually measured (at the current but also unknown pressure $\Delta Pc$). The balancing factor a is calculated from the square root of the ratio $\beta$, namely $$\alpha = \sqrt{\beta} = \sqrt{\frac{\Delta P_0}{\Delta Pc}} = \frac{\sum_i Ft_i}{Fc_{total}},$$

and thus corresponds to the ratio of the desired total target flow $$Ft_{total} = \sum_i Ft_i$$

(at a constant but unknown initial pressure $\Delta P_0$) to the current total flow $Pc_{total}$ actually measured.

In step S31, the balancing module 12 then continues with the calculation of new corrected valve position $H'_i$ at which the current individual target flows $Ft_i$ are each corrected with the balancing factor $Ft'_i = \alpha \cdot Ft_i$ (where the corrected individual flows $Ft'_i$ become new current individual target flows at the current but unknown pressure $\Delta Pc$).

At a pressure change in the current pressure $\Delta Pc$ in the fluid transport system 5, 5' with respect to the initial pressure $\Delta P_0$, the current flow Fc deviates from the desired target flow Ft and yields a balancing factor $\alpha \neq 1$. For example, the actual flow $Fc = 2 \cdot Ft$ is doubled when the pressure is quadrupled $\Delta Pc = 4 \cdot \Delta P_0$, which yields a balancing factor of $$\alpha = \sqrt{\frac{\Delta P_0}{\Delta Pc}} = \sqrt{\frac{\Delta P_0}{4\Delta P_0}} = 0.5.$$

As shown in FIG. 4, the current flow Fc, which is different from the target flow Ft and is actually achieved at a valve position $H_i$ for the target flow $Ft_i$ at a deviation in the current flow Fc from the initial pressure $\Delta P_0$ (for example, a doubled flow $Fc = 2 \cdot Ft$) is corrected by scaling the target flow $Ft_i$ with the balancing factor $Ft'_i = \alpha \cdot Ft_i$ (step a: for example, a reduction in the target flow by one half $Ft'_i = 0.5 \cdot Ft_i$) and a setting of the regulating valve V11, V22, V33, Vii is corrected with the valve position H'i, which is assigned via the characteristic data (step b: H'i for F't$_i$ from curve fh).

In one embodiment variant, in addition temperature sensors, which make it possible to determine the temperature difference $\Delta T_i$=Tin$_i$−Tout, between the input temperature Tin$_i$ and the output temperature Tout$_i$ of the respective fluid in the consumers V1, V2, V3, Vi to be returned in the respective device for the exchange of thermal energy (heat exchanger) are arranged in the fluid transport system 5. For example, for the determination of the input temperature Tin$_i$, a common temperature sensor is arranged in the forward flow to the consumers V1, V2, V3, Vi or a plurality of separate temperature sensors are provided in the forward flows of the individual consumers V1, V2, V3, Vi. The various output temperatures Tout$_i$ are each measured by separate temperature sensors in the return flows of the individual consumers V1, V2, V3, Vi. The balancing device 1 is connected to the temperature sensors and is configured to detect the input temperatures Tin$_i$ and output temperatures Tout$_i$, of the individual consumers V1, V2, V3, Vi and to determine the respective temperature differences $\Delta T_i$=Tin$_i$−Tout$_i$ for the consumers V1, V2, V3, Vi. The balancing device 1 is also configured to ascertain the proportional current energy output $$Ec_i = \frac{Fc_{total} \cdot Ft_i \cdot \Delta T_i}{Ft_{total}}$$

("current individual energy") through the consumers V1, V2, V3, Vi in the balanced condition based on the measured current total flow and/or total volume flow Fc$_{total}$ and the individual target flows Ft, and temperature differences $\Delta T_i$. The balancing device 1 also determines the total energy output $$Ec_{total} = \sum_i Ec_i$$

("current total energy") by the consumers V1, V2, V3, Vi. The total energy Ec$_{total}$ thus ascertained is used in the balancing device 1 or in the higher-level control system 30 for regulation and in particular for limitation of the total energy Et$_{total}$=f(Ec$_{total}$) ("total target energy") to be output via the fluid transport system 5, 5' in the balancing device 1 or in the higher-level control system. It is thus possible in the fluid transport system 5, 5' to measure and regulate both the individual energy quantities Ec$_i$ output in the individual consumers V1, V2, V3, Vi and the total energy Ec$_{total}$ output in the fluid transport system 5, 5' with the flow measurement and/or volume flow measurement in just a single common flow sensor 4.

As indicated by the arrow S35, the determination of the balancing factor a and the dynamic balancing in step S3 are performed periodically, for example, with a period of three to thirty seconds, e.g., every five seconds or ten seconds.

In conclusion, it should be pointed out that, although computer program code has been assigned to specific functional modules in the description and the execution of steps has been presented in a certain sequence, those skilled in the art will, however, understand that the computer program code can be structured in various ways and that the sequence of at least certain steps can be altered without thereby deviating from the subject matter of protection.

The invention claimed is:

1. A method for balancing a group of consumers in a fluid transport system in which the consumers are each provided with a motorized regulating valve for regulating the flow through the consumer, wherein the method comprises:
    storing characteristic data for the consumers which determine a valve position of the corresponding regulating valve for the consumers for target flows through one of the consumers each at a constant pressure in the fluid transport system,
    ascertaining a current total flow through the group of consumers by means of a common flow sensor,
    determining a balancing factor based on the current total flow and a sum of the desired target flows through the consumers, and
    performing a dynamic balancing of the consumers by setting the valve position of the corresponding regulating valves based on the characteristic data and the target flows scaled using the balancing factor,
    wherein the method further comprises:
    detection of the characteristic data for the consumers by measurement of the flow for the consumers in various valves settings of the regulating valves by means of the common flow sensor, calculating a current pressure in the fluid transport system based on these measurements and normalizing the characteristic data for the consumers at the constant pressure in the fluid transport system based on the current pressure in the fluid transport system.

2. The method according to claim 1, wherein the method further comprises normalization of the characteristic data for the consumers by scaling the measured flow through one of the consumers based on the current pressure in the fluid transport system.

3. The method according to claim 1, wherein the method further comprises calculating the current pressure in the fluid transport system based on a linear pump characteristic for at least one line segment having a plurality of consumers.

4. A method for balancing a group of consumers in a fluid transport system in which the consumers are each provided with a motorized regulating valve for regulating the flow through the consumer, wherein the method comprises:
    storing characteristic data for the consumers which determine a valve position of the corresponding regulating valve for the consumers for target flows through one of the consumers each at a constant pressure in the fluid transport system,
    ascertaining a current total flow through the group of consumers by means of a common flow sensor,
    determining a balancing factor based on the current total flow and a sum of the desired target flows through the consumers, and
    performing a dynamic balancing of the consumers by setting the valve position of the corresponding regulating valves based on the characteristic data and the target flows scaled using the balancing factor,
    wherein the method further comprises detection of the characteristic data for the consumers by setting the regulating valves for a first set of the consumers in a blocking position, and measuring the flow through a second set of the consumers in various valve position by means of the common flow sensor.

5. A method for balancing a group of consumers in a fluid transport system in which the consumers are each provided with a motorized regulating valve for regulating the flow through the consumer, wherein the method comprises:

storing characteristic data for the consumers which determine a valve position of the corresponding regulating valve for the consumers for target flows through one of the consumers each at a constant pressure in the fluid transport system, ascertaining a current total flow through the group of consumers by means of a common flow sensor, determining a balancing factor based on the current total flow and a sum of the desired target flows through the consumers, and performing a dynamic balancing of the consumers by setting the valve position of the corresponding regulating valves based on the characteristic data and the target flows scaled using the balancing factor, wherein the method further comprises detection of the characteristic data for a consumer of the group by setting the regulating valves for the other consumers of the group in a blocking position, and measuring the flow through the one consumer in various valve position by means of the common flow sensor.

6. A device for balancing a group of consumers in a fluid transport system in which the consumers are each provided with a motorized regulating valve for regulating the flow through the consumer and a common flow sensor for measuring the total flow through the group of consumers is provided, wherein the device comprises:

hardware circuitry to, or at least one processor programmed to execute instructions to:

store characteristic data for the consumers, such that the characteristic data determine a valve position of the corresponding regulating valve for target flows through the respective consumer at a constant pressure in the fluid transport system, and ascertain the current total flow through the group of consumers by means of the flow sensor, to determine a balancing factor based on the current total flow and a sum of the desired target flows through the consumers and performing a dynamic balancing of the consumers by setting the valve position of the corresponding regulating valves based on the characteristic data and the target flows scaled using the balancing factor, and detect the characteristic data for the consumers by measurement of the flow through the consumers in various valve position of the regulating valves by means of the common flow sensor, to calculate a current pressure in the fluid transport system based on the measurements and to normaiize the characteristic data for the consumers based on the current pressure in the fluid transport system at the constant pressure in the fluid transport system.

7. The device according to claim 6, wherein the characteristic data for the consumers is normalized by scaling the measured flow through one of the consumers based on the current pressure in the fluid transport system.

8. The device according to claim 6, wherein the current pressure in the fluid transport system is calculated based on a linear pump characteristic for at least one line segment having a plurality of consumers.

9. A device for balancing a group of consumers in a fluid transport system in which the consumers are each provided with a motorized regulating valve for regulating the flow through the consumer and a common flow sensor for measuring the total flow through the group of consumers is provided, wherein the device comprises:

hardware circuitry to, or at least one processor programmed to execute instructions to:

store characteristic data for the consumers, such that the characteristic data determine a valve position of the corresponding regulating valve for target flows through the respective consumer at a constant pressure in the fluid transport system, and ascertain the current total flow through the group of consumers by means of the flow sensor, to determine a balancing factor based on the current total flow and a sum of the desired target flows through the consumers and performing a dynamic balancing of the consumers by setting the valve position of the corresponding regulating valves based on the characteristic data and the target flows scaled using the balancing factor, and detect the characteristic data for the consumers, such that the regulating valves are set in a blocking position for a first set of the consumers and the flow through a second set of the consumers is measured in various valve position by means of the common flow sensor.

10. A device for balancing a group of consumers in a fluid transport system in which the consumers are each provided with a motorized regulating valve for regulating the flow through the consumer and a common flow sensor for measuring the total flow through the group of consumers is provided, wherein the device comprises:

hardware circuitry to, or at least one processor programmed to execute instructions to:

store characteristic data for the consumers, such that the characteristic data determine a valve position of the corresponding regulating valve for target flows through the respective consumer at a constant pressure in the fluid transport system, and ascertain the current total flow through the group of consumers by means of the flow sensor, to determine a balancing factor based on the current total flow and a sum of the desired target flows through the consumers and performing a dynamic balancing of the consumers by setting the valve position of the corresponding regulating valves based on the characteristic data and the target flows scaled using the balancing factor, and detect the characteristic data for one of the consumers based on the fact that the regulating valves for the other consumers of the group are set in a blocking position and the flow through one of the consumers is measured in various valve position by means of the common flow sensor.

* * * * *